Patented Nov. 15, 1932

1,887,863

UNITED STATES PATENT OFFICE

EARL P. STEVENSON, OF NEWTON, MASSACHUSETTS, ASSIGNOR TO ARTHUR D. LITTLE INDUSTRIAL CORPORATION, A CORPORATION OF DELAWARE

PROCESS FOR MAKING PULP

No Drawing.  Application filed November 15, 1929. Serial No. 407,567.

The present invention relates to a method for preparing hard woods for conversion into paper pulp. By virtue of this invention, oak birch, maple, beech, and in fact substantially all types of hard woods may be satisfactorily processed, as well as hard-wood waste from furniture factories, saw mills and other woodworking and wood-processing establishments.

The invention is particularly adapted for incorporation in the type of process defined in the co-pending application of Eric Wahlforss, Serial No. 126,087, filed July 30, 1926, and in fact is intended primarily as an improvement in such a process. In this process paper pulp is produced from hard wood in chip or similar form by subjecting the wood to the action of organic compounds derived from the hard wood itself when heated in the presence of water to temperatures corresponding to steam pressures in approximately the range from 75 to 100 pounds until the organic encrusting substances contained in the hard wood are softened and rendered plastic and the fibrous mass capable of further separation and conversion into pulp without chemical treatment or mechanical grinding. The product resulting from such a process and to which my present invention is particularly applicable may be employed in the manufacture of box boards or other built-up or plied boards where a light color is not a major requisite. It may also be employed as bogus Manilas, test liners and the like, and is especially suitable as a substitute for strawboard in the manufacture of corrugated board, due to its greater strength and resistance to crushing forces.

In the Wahlforss process above referred to, the acid products developed within the chips pass by diffusion into the surrounding liquor in which the chips are immersed, with the result that there is gradually built up a concentration of these acid products in the liquor which slows up and inhibits further diffusion. As a consequence the continued generation of acid products within the chips is uncontrolled until a concentration undesirably drastic in its action upon the wood may be reached.

It is the purpose of my improvement on this process to maintain the body of the liquor in a substantially neutral condition which permits, throughout the duration of the cooking process, the continuous diffusion of the acid products into the liquor while ensuring the development within the chips of the desired acid products and at the same time preventing their accumulation or concentration within the chips to an extent which may impair the strength or otherwise lower the quality of the final product.

To the attainment of the above ends, I propose to add to the water employed for cooking or digesting the wood, as described by Wahlforss, a substance neither acid nor alkaline, such as calcium carbonate or magnesium carbonate, which, however, has the capacity to combine with and neutralize organic acids liberated from the wood and diffusing into the water during the cooking or digesting process with a resulting maintenance of the body of the liquor in a substantially neutral condition. In carrying out my process, I preferably employ an insoluble ingredient, such as calcium carbonate, which may be in the form of ground marble or a mixture of calcium and magnesium carbonates as in dolomite, in a sufficiently fine state of subdivision to remain in suspension or distributed throughout the mass of chips in the cooking vessel, and immediately combine with and neutralize organic acids derived from the wood as these diffuse from the wood in the process.

In the actual practice of my new process, I have employed equal parts of birch and beech in chip or equivalent form, charged into a spherical rotary digester with water and calcium carbonate in the proportion of 14 per cent. by weight or dry wood. The whole is then cooked for a period of approximately two hours under a pressure of 90 pounds per square inch, and a temperature corresponding to that of steam at the given pressure. The motion of the digester during cooking serves to maintain the carbonates in suspension throughout the cooking liquor. After the completion of cooking, the chips are removed and converted to pulp in a rod mill or its equivalent. The pulp is then run off on a paper machine. On this basis the yield of paper is approximately 80 per cent. on the dry basis of the original chips. Such paper having a weight of 34 pounds per thousand square feet and a caliper of nine points in thickness, has shown a Mullen test of 55.

This improved result I attribute to the more uniform "cooking" of the wood chips through the mechanism of regulating or controlling the acidity of the cooking liquor throughout the digestion period. In the absence of a neutralizing agent the concentration of the organic acids in the cooking liquid progressively increases as the digestion proceeds, with the result that the surface layer of fibers of the individual chips may be subjected to a too drastic chemical action; also the strength of acids within the individual chips may increase beyond the point at which the proper regulation of the digestive process is secured.

The principle underlying this improved process is to control the tendency for the organic acids formed from the decomposition of the organic encrusting substances contained in hard wood to act upon the desired fibrous material, and to do so under conditions which will not inhibit or alter the nature of the reactions upon which the Wahlforss process rests. The preferred means for applying this principle is to suspend in the cooking liquor an insoluble salt of a relatively weak base and an acid which is weaker than those formed from the water digestion of hard woods, and is consequently replaceable thereby. Calcium carbonate or magnesium carbonate are ideal for this purpose. Their action can be expressed by the equation:

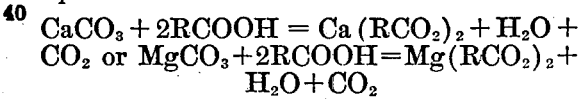

in which "R" represents any organic radical. Ground marble, lime stone, or other naturally-occurring forms of calcium carbonate are satisfactory; also dolemitic limestones or magnesite.

Equivalent results can also be obtained with the careful use of weak alkalies, such as magnesia, MgO; and under carefully controlled conditions slaked lime, $Ca(OH)_2$, might be used. I, however, do not prefer their use, as under some circumstances, such as those under which slaked lime has heretofore been used in pulping operations, an alkaline condition instead of the desired acid condition is obtained within the chips, with consequent decrease in yield of pulp per ton of wood processed, and variation in the nature of the finished product. With different mixtures of hard woods varying amounts of organic acids may be found during the digestive process, and an amount of lime to be used determined under one set of conditions may prove excessive under other conditions. When using calcium carbonate, magnesium carbonate, or like materials, any excess in the amount charged to the digester is of no consequence. In their use it is not necessary to resort to careful methods for chemical control, and a substantially neutral liquor is obtained under widely varying conditions.

The product resulting from my new process is similar in characteristic appearance to that produced by the Wahlforss process hereinbefore referred to, and measurably superior in the quality and quantity of paper pulp produced thereby.

The material resulting from my improved process and suitable for the production of pulp consists essentially of hard-wood fibres of measurably the same length in which the fibres naturally occur with absence of shortening due to chemical or mechanical action, these fibres being surrounded by the major portion of the organic encrusting substances originally present in the wood but softened and rendered plastic throughout in a manner to permit separation of the individual fibres without grinding or similar treatment, the material having substantially the physical shape or configuration of the chip or like form as cut from the natural wood, and a characteristic dark brown color resulting from the interaction of constituents present in the wood but being entirely free of chemicals or compounds resulting from chemical constituents other than those originally present in the wood. By virtue of this treatment, the material is susceptible of conversion directly into pulp by a simple impact operation without grinding or treatment with added chemical agents.

What is claimed is:

1. A process for the manufacture of pulp from hard wood which consists in digesting the hard wood under heat and pressure in the presence of water and an insoluble carbonate, whereby a substantially neutral condition of the liquor is maintained.

2. A process for the manufacture of pulp from hard wood which consists in digesting the hard wood under heat and pressure in the presence of water having an insoluble alkaline reagent suspended therein and functioning to maintain a substantially neutral condition in the digesting liquor.

3. A process for the manufacture of pulp from hard wood which consists in digesting the hard wood under heat and pressure with water containing an insoluble carbonate in suspension, functioning to maintain a substantially neutral condition in the digesting liquor.

4. A process for the manufacture of pulp from hard wood which consists in digesting hard wood chips under heat and pressure in the presence of water having a carbonate of an alkaline earth suspended therein.

5. A process for the manufacture of pulp from hard wood which consists in digesting the hard wood under heat and pressure in the presence of water having calcium carbonate suspended therein in the proportion of five to fifteen per cent. by weight to the weight of the dry hard wood.

6. A process for the manufacture of pulp from hard woods which consists in developing and maintaining an acid condition within the substance of the wood while the wood is submerged in a neutral liquor capable of progressively neutralizing organic acids liberated from the wood, and avoiding the development of an alkaline condition therein.

7. A process for the manufacture of pulp from hard wood which consists in digesting the hard wood under heat and pressure in the presence of a continuously neutral liquor capable of effectively neutralizing the organic acids developed in the wood and liberated therefrom during the cooking process without developing an alkaline condition within the wood.

8. A process for the manufacture of pulp from hard wood which consists in heating the hard wood in the presence of water containing a reagent neither acid nor alkaline and capable of effectively neutralizing volatile acids liberated from the hard wood during the cooking process, and maintaining a temperature sufficiently high to soften and render plastic the organic encrusting substances which surround the fibrous mass.

9. A process for the manufacture of pulp from hard wood which consists in subjecting the hard wood to the action of organic compounds derived from the hard wood itself when heated in the presence of water to a temperature corresponding to steam pressure in approximately the range of from 75 to 100 pounds, the water having added thereto a substance capable of neutralizing volatile acids liberated from the wood while maintaining a neutral condition of the cooking liquor without causing an alkaline condition within the wood, and continuing the cooking process until the organic encrusting substances contained in the hard wood are softened and rendered plastic and the fibrous mass capable of further separation and conversion into pulp without chemical treatment or mechanical pulp grinding.

EARL P. STEVENSON.